United States Patent [19]

Parekh

[11] 4,417,044
[45] Nov. 22, 1983

[54] PROCESS FOR MAKING POLYETHERIMIDES

[75] Inventor: Shashi L. Parekh, Pittsfield, Mass.

[73] Assignee: General Electric Company, Pittsfield, Mass.

[21] Appl. No.: 381,859

[22] Filed: May 25, 1982

[51] Int. Cl.³ ............................................ C08G 73/10
[52] U.S. Cl. ..................................... 528/179; 528/26; 528/125; 528/126; 528/128; 528/172; 528/180; 528/181; 528/182; 528/185; 528/207; 528/208
[58] Field of Search ............... 528/185, 172, 125, 126, 528/128, 207, 208, 26, 179–182

[56] References Cited

U.S. PATENT DOCUMENTS 4,157,996  6/1979  Boldebuck et al. ................. 528/185

Primary Examiner—Lester L. Lee
Attorney, Agent, or Firm—Bernard, Rothwell & Brown

[57] ABSTRACT

A process for making polyetherimides involving reacting an aromatic bis(ether anhydride) with an organic diamine in an inert solvent to form a prepolymer solvent mixture, effecting solvent removal by thin-film evaporation, and heating the resulting prepolymer to a temperature above the glass transition temperature of the final polyetherimide product and less than 450° C. to form the polyetherimide.

18 Claims, No Drawings

PROCESS FOR MAKING POLYETHERIMIDES

BACKGROUND OF THE INVENTION

Polyetherimides are unique polymers which exhibit superior physical and chemical properties, including high heat resistance, exceptional strength, and excellent processability. These polymers can be used as wire coatings and are particularly suited for injection molding applications.

A number of processes for making polyetherimides have been disclosed. Generally, these polymers are prepared by reacting an organic diamine with a aromatic bis(ether dicarbonyl), i.e., an aromatic bis(ether anhydride) or an aromatic bis(ether dicarboxylic acid). Two processes which have been of particular interest are the so-called melt polymerization and solution polymerization processes. The basic melt polymerization process was described by T. Takekoshi and J. Kochanowski, U.S. Pat. No. 3,803,805. This process involves combining an aromatic bis(ether anhydride) and organic diamine and heating the mixture under an inert atmosphere to form a homogeneous melt. Water formed during the polymerization reaction is removed at a temperature of up to 350° C. In a preferred embodiment of the process, the final stage of the reaction is conducted under reduced pressure to facilitate removal of water. The basic polyetherimide polymerization technique has been improved by employing certain catalysts to enhance yields or reaction rates (for example, see Takekoshi, et al. U.S. Pat. No. 3,833,544 and F. Williams III, et al., U.S. Pat. No. 3,998,840, and Takekoshi, U.S. Pat. No. 4,324,882). In addition, the melt polymerization method has been adapted to the continuous mode by conducting the reaction in extrusion apparatus (for example, see Takekoshi, et al. U.S. Pat. No. 4,011,198 and Banucci, et al. U.S. Pat. No. 4,073,773).

Solution polymerization is generally conducted by reacting an aromatic bis(ether anhydride) and an organic diamine in an inert solvent at temperatures up to about 200° C. With this procedure, water of reaction is typically removed by azeotropic distillation. The resulting polymer is generally recovered by mixing the reaction solution with a precipitant, such as methanol. The reaction solvents employed for solution polymerization reactions are selected for their solvent properties and their compatibility with the reactants and products. High-boiling nonpolar organic solvents are preferred. (E.g., see Takekoshi, et al., U.S. Pat. No. 3,991,004). Dipolar, aprotic solvents and phenolic solvents can also be used, particularly when an aromatic bis(ether dicarboxylic acid) is used as the starting material (e.g., see Takekoshi, et al., U.S. Pat. No. 3,905,942).

D. Heath and J. Wirth (U.S. Pat. No. 3,847,867) disclose a method for preparing polyetherimides which involves stirring a solution of an aromatic bis(ether anhydride) and an organic diamine in a dipolar, aprotic solvent under ambient conditions to produce a polyacid amide, casting the polyacid amide solution on a substrate to facilitate the removal of the organic solvent, and then heating the substrate in a stepwise manner to 200°-300° C. to complete the conversion of the polyacid amide to the polyetherimide.

Although the foregoing procedures have been used effectively to produce polyetherimides of high quality, they do suffer from certain disadvantages. The principal problems associated with the melt polymerization technique involve controlling the stoichiometric ratio of the reactants during the course of the reaction. To economically produce a polymer having the desired physical and chemical characteristics, it has been found important to control the relative proportions of anhydride, diamine and any chain termination agent that is employed. Because of the relatively high temperatures employed in the melt polymerization process and the disparate volatilities of these components, controlling the stoichiometry of the mixture has proven difficult. A further disadvantage of conventional melt polymerization techniques is that the reaction mixtures pass through a so-called "cement stage" as polyacid amide intermediate is formed. During this phase of the reaction, the reaction mixtures become very viscous and difficult to process.

The solution process, on the other hand permits accurate control over the stoichiometry of the reaction mixture, but suffers from the disadvantages that reaction times are relatively long and it is sometimes difficult to achieve substantially complete conversion of the reactants or immediate polyacid amides to the polyetherimide product.

Accordingly, there is a continuing need for an efficient process for producing high quality polyetherimides.

SUMMARY OF THE INVENTION

In accordance with the present invention, there is disclosed a process for making polyetherimide, which comprises:

(a) reacting an aromatic bis(ether anhydride) with an organic diamine in an inert solvent under polyetherimide-forming conditions to form a prepolymer-solvent mixture;

(b) forming a thin film of the prepolymer-solvent mixture under solvent-volatilizing conditions to effect substantially complete removal of solvent and water of reaction from said mixture to form a prepolymer; and (c) heating the prepolymer to a temperature above the glass transition temperature of the final polyetherimide product and less than about 450° C. to form the polyetherimide.

DETAILED DESCRIPTION OF THE INVENTION

The first step of the process of the present invention involves reacting an aormatic bis (ether anhydride) of the formula

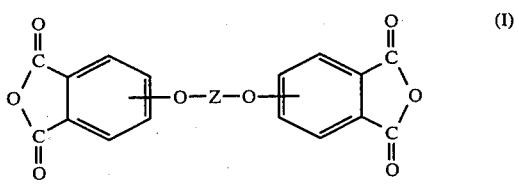

with at least one organic diamine having the formula (II)

in an inert solvent under polyetherimide-forming conditions, wherein Z is a member selected from the group consisting of (A) divalent organic radicals of the formula:

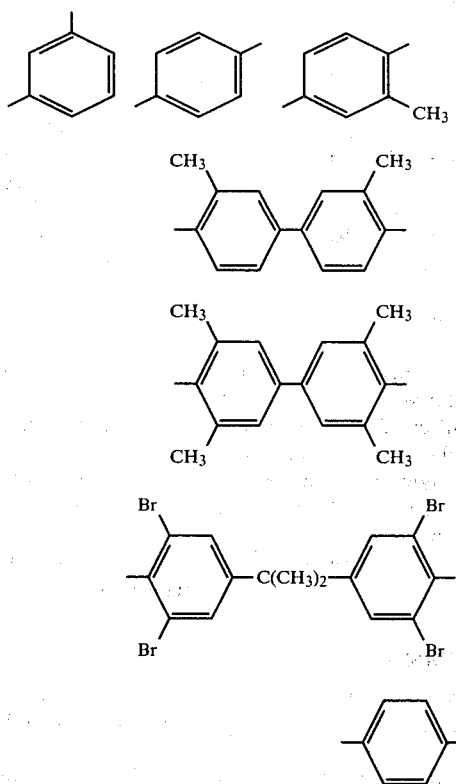

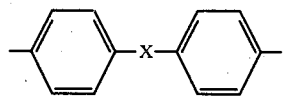

and (B) divalent organic radicals of the general formula

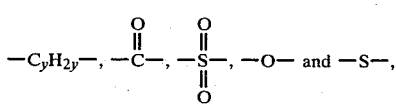

where X is a member selected from the group consisting of divalent radicals of the formulas $$-C_yH_{2y}-, \quad -\overset{\overset{O}{\|}}{C}-, \quad -\overset{\overset{O}{\|}}{\underset{\underset{O}{\|}}{S}}-, \quad -O- \text{ and } -S-,$$

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, (c) from $C_2$ to about $C_8$ alkylene terminated polydiorganosiloxane, and (d) divalent radicals of the general formula

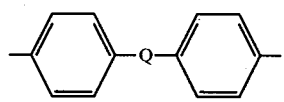

where Q is a member selected from the group consisting of:

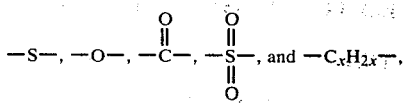

and x is an integer from 1 to about 5.

Bis(ether anhydride)s of formula I include, for example,
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride.

A preferred class of aromatic bis(ether anhydride)s included by formula I includes compounds of formulas III, IV and V, which follow:

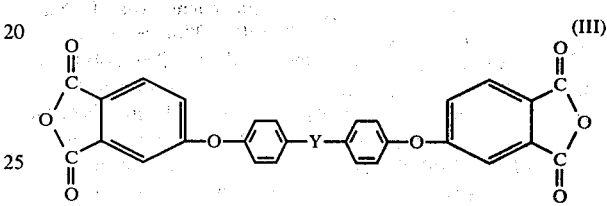
(III)

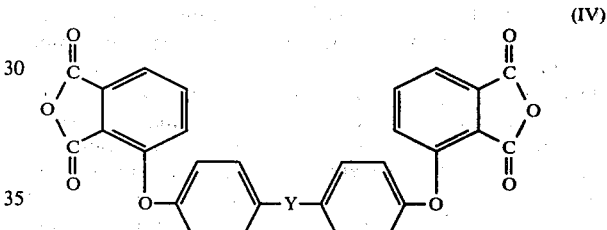
(IV)

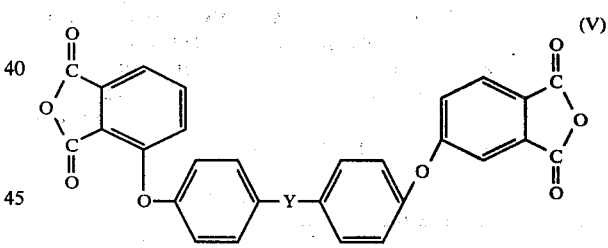
(V)

and mixtures thereof, where Y is selected from the group consisting of —O—, —S—,

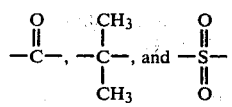

Aromatic bis(ether anhydride)s of formula III include, for example:
2,2-bis[4-(3,4-dicarboxyphenoxy)phenyl]propane dianhydride,
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula IV include, for example:

2,2-bis[4-(2,3-dicarboxyphenoxy)phenyl]propane dianhydride;

4,4'-bis(2,3-dicarboxyphenoxy)diphenyl ether dianhydride;

4,4'-bis(2,3-dicarboxyphenoxy)diphenyl sulfide dianhydride;

4,4'-bis(2,3-dicarboxyphenoxy)benzophenone dianhydride;

4,4'bis (2,3-dicarboxyphenoxy)diphenyl sulfone dianhydride; and mixtures thereof.

The aromatic bis(ether anhydride) of formula V may be, for example, 4-(2,3-dicarboxyphenoxy)-4'-(3,4-dicarboxyphenoxy)diphenyl-2,2-propane dianhydride.

Some of the aromatic bis(ether anhydride)s of formula (I) are shown in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of a dihydric phenol compound in the presence of a dipolar, aprotic solvent.

Additional aromatic bis(ether anhydride)s also included by Formula (I) are shown by Koton, M. M., Florinski, F. S.; Bessonov, M.I.; Rudakov, A. P. (Institute of Heteroorganic Compounds, Academy of Sciences, U.S.S.R.), U.S.S.R. 257,010, Nov. 11, 1969, Appl. May 3, 1967, and by M. M. Koton, F. S. Florinski, *Zh. Org. Khin,* 4(5), 774 (1968).

The organic diamines of Formula (II) include, for example:
m-phenylenediamine,
p-phenylenediamine,
4-4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminodiphenyl ether (commonly named 4,4'-oxydianiline),
1,5-diaminonaphthalene,
3,3'-dimethylbenzidine,
3,3'-dimethoxybenzidine,
2,4-bis(β-amino-t-butyl)toluene,
bis(p-β-amino-t-butylphenyl)ether, bis(p-β-methyl-o-aminopentyl)benzene,
1,3-diamino-4-isopropylbenzene,
1,2-bis(3-aminopropoxy)ethane,
benzidine,
m-xylylenediamine,
p-xylylenediamine,
2,4-diaminotoluene
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, and mixtures of such diamines.

The polyetherimide-forming conditions employed in the first process step generally include a reaction temperature of from about 40° C. to about 200° C., preferably from about 80° C. to about 180° C. The solvent can be an inert nonpolar organic solvent or an inert polar solvent that does not deleteriously affect the reaction. Relatively high-boiling, nonpolar solvents are preferred, and examples of such solvents are benzene, toluene, xylene, ethylbenzene, propylbenzene, chlorobenzene, dichlorobenzenes, trichlorobenzenes, biphenyl, terphenyl, diphenylether, diphenyl sulfide, acetophenone, chlorinated biphenyl, chlorinated diphenylethers, dichloroethane, tetrachloroethane, trichloroethylene, tetrachloroethylene, methylcyclohexane, octane, isooctane, decane, and the like.

Polar reaction solvents that can be used include phenolic solvents, such as phenols, cresols, ethylphenols, isopropylphenols, t-butylphenols, xylenols, chlorophenols, dichlorophenols, phenylphenols, and the like. In addition, dipolar, aprotic solvents can be employed as reaction solvents. Such solvents are generally non-acid, oxygen-containing, nitrogen-containing organic solvents and include, for example, N,N-dimethylacetamide, N-methylpyrrolidone, N,N-dimethylformamide, dimethylsulfoxide, hexamethylphosphoramide, and the like.

Mixtures of such solvents can also be employed. A particularly preferred solvent is o-dichlorobenzene.

The order of addition of reactants is not critical. It is preferred to effect the reaction of the dianhydride and the organic diamine in an inert atmosphere, such as nitrogen or helium. Sufficient solvent is generally utilized to provide a solids content in the range between 1% and 90%, preferably in the range between about 15% and about 60%.

It has been found that substantially equal molar amounts of the organic diamine and the aromatic bis(ether anhydride) provide optimum results when the polymerization is conducted in either a batch or continuous manner. Effective results can be achieved with 0.5 to 2.0 mole of organic diamine per mole of aromatic bis(ether anhydride); the preferred range being from about 0.9 to about 1.1 mole or organic diamine per mole of aromatic bis (either anhydride). Monofunctional organic amines such as aniline, or organic anhydrides such as phthalic anhydride and maleic anhydride provide molecular weight control. From 0.1 to 50 mole percent of comonomers based on the total moles of reactants can be employed to form copolymers.

Reaction time for the first process step can vary from about 0.5 to about 20 hours, depending upon such factors as the temperature employed, degree of agitation, nature of reactants, solvent, and the like. Various catalysts can be employed in catalytic amounts. Such catalysts include inorganic salts, such as alkali metal carbonates, sodium chlorate or ferric sulfate, and oxygenated phosphorous compounds of various alkali metals, such as sodium phenyl phosphonate.

The first reaction step can be conveniently monitored by measuring the intrinsic viscosity of the polymer that is produced. Generally, higher intrinsic viscosities, indicate greater degrees of polymerization. The first reaction step is preferably conducted to an intrinsic viscosity of at least about 0.25 dl/g, preferably at least about 0.30 dl/g.

During the course of the reaction, water of reaction is removed. The amount of water generated, as a percentage of theoretical, can also be used to monitor the course of the reaction. Water can be conveniently removed on a continuous basis by azeotropic distillation, employing a low-boiling azeotropic solvent.

The first process step produces a prepolymer-solvent mixture. As used herein, the term prepolymer means a material which generally contains a substantial amount of polyetherimide, but also typically contains partially reacted oligomers and polyacid amide intermediate compounds.

The prepolymer-solvent mixture from the first reaction step is subjected to a second process step, wherein the mixture is formed into a thin film under solvent-volatilizing conditions to effect substantially complete solvent and water removal. This step can advantageously be conducted in a continuous manner using conventional thin-film evaporation equipment. Such equipment can take a variety of forms, and the process of the present invention is not limited to any particular form of equipment. Typical thin-film evaporation equipment consists of a heated, large-diameter, cylindrical or tapered tube in which is rotated a series of wipers, either maintaining a fixed close clearance from the wall or riding on a film of liquid on the wall. The continuous forming and reforming of the film permits concentration of viscous materials. Reduced pressure may be employed to accelerate solvent removal, and an evaporation temperature of from about 200° C. to about 450° C., preferably from about 250° C. to about 350° C. is employed. Lower temperatures result in very viscous mixtures, which are difficult to process and can damage equipment, whereas higher temperatures can cause decomposition of the product. Thin-film evaporation permits efficient solvent recovery, which is advantageous from both economical and ecological standpoints.

The elevated temperatures employed in the second process step result in further polymerization of the prepolymer. The degree of polymerization is dependent on a number of factors, including throughput rate, temperature, pressure and surface renewal rate. The product of the second process step is generally a prepolymer having a substantially reduced solvent content.

As a final process step, the prepolymer from the second process step is heated to a temperature above the glass transition temperature of the polyetherimide polymer product and less than about 450° C. to form a polyetherimide. Preferred temperatures for this step range from about 250° C. to about 350° C. In the final process step, substantially complete polymerization and solvent and water removal occur. From a processing standpoint, there might not be a clear separation between the second process step and the final process step. For example, the prepolymer may be retained in a thin-film evaporator beyond the point at which a substantial portion of the solvent has been removed, thus effecting substantially complete polymerization.

In a preferred embodiment of the process, the prepolymer is continuously transferred from the outlet of a first thin-film evaporator to the inlet of a second thin-film evaporator maintained at melt polymerization temperatures. The final process step is conducted in the second thin-film evaporator and advantageously employs reduced pressure to facilitate removal of remaining traces of solvent and water. From the second thin-film evaporator, the polyetherimide can be continuously extruded, air cooled, and pelletized to form a resin product suitable for injection molding and other applications. Such extrusion can be effected, for example, by means of a pump which pumps the heated polymer from the second thin-film evaporator through a suitable die.

In an alternative embodiment, the second and third process steps are conducted in a combined thin-film evaporator-screw extrusion apparatus. In this embodiment, the second process step occurs in the thin-film evaporator and the final process step occurs in the screw extruder. Of course, other combinations of equipment can also be employed (e.g., a plurality of thin-film evaporators in parallel or series, followed by extruders), and the process of the invention is not limited to any particular apparatus. The final process step only need be conducted until substantially complete polymerization and solvent removal, has been achieved. Generally, the processing times are relatively short (depending on the equipment used), e.g., less than about 15 minutes for the second and final process steps and less than about 5-6 minutes for the final process step.

The present process overcomes the disadvantages of the melt polymerization process and the solution polymerization process when used separately. The lengthy reaction times and incomplete reactions associated with solution polymerizations are avoided by the solvent removal and high-temperature processing. On the other hand, by conducting a prepolymerization reaction in solution, the problems commonly associated with melt polymerization techniques are avoided. The losses of volatile reactants are minimized, and the so-called "cement stage" does not occur.

The invention is further illustrated by the following examples, which are not intended to be limiting.

EXAMPLES I-XVIII

Several production batches of polyetherimide were prepared by the process of the present invention. Each batch was prepared by the following procedure:

First Process Step

The following components were charged into a reaction vessel:

|  | wt. % |
|---|---|
| o-Dichlorobenzene | 67.8 |
| 2,2-Bis[4-(3,4-dicarboxyphenoxy)phenyl]-propane dianhydride (BPA-DA) | 26.1 |
| Phthalic Anhydride | 0.49 |
| Sodium Phenyl Phosphonate | 0.0065 |
| m-phenylenediamine | 5.6 |

The first four components were added to the vessel, heated to 50° C. and agitated. After a short period of agitation (at least 5 minutes), the m-phenylenediamine was added to the vessel, and the mixture was heated to 150° C. Upon reaching 150° C., the mixture was transferred to a feed tank which was maintained at 150° C.-160° C. The progress of the reaction was monitored by determining intrinsic viscosities of reaction samples. Intrinsic viscosities were calculated from gel permeation chromatography data. When the intrinsic viscosity of the polymer in the feed tank reached 0.35–0.42 dl/g (indicating substantial polymerization), the mixture was transferred from the feed tank to the next process step.

Second and Third Process Steps

The second and third process steps were conducted in an apparatus consisting of two close-tolerance, rotary-blade, thin-film evaporators arranged in series with a high-pressure extrusion pump at the outlet of the second evaporator. The first evaporator stage of the apparatus was maintained at a temperature of from 315° C.–342° C., the rotor speed was maintained in the range of 123–159 rpm, and the pressure was maintained at 0–5 inches Hg. The prepolymer-solvent mixture from the first process step was fed into the evaporator stage on a continuous basis. Vapors from the evaporator were passed through a condenser and a carbon filter to effect solvent recovery and purification of the effluent gases. The prepolymer from the first evaporator stage had average residual o-dichlorobenzene concentrations of about 8600 ppm.

The prepolymer from the first evaporator stage was passed to the second evaporator stage through a high-pressure line maintained at a temperature of 328° C.–360° C. The second evaporator stage was maintained at a temperature of from 323° C.–340° C., the rotor speed was maintained in the range of 132–168 rpm, and the absolute pressure was 1–26 torr. The average residence time of the polymer in the second evaporator stage was about 5 minutes. The polyetherimide was extruded through a circular die, air-dried and chopped into pellets. The residual concentrations of o-dichlorobenzene in the final polymer product varied with the final stage vacuum, but generally, residues of 20 ppm were achieved with pressures at 10 torr or less. The polymers produced by this process had excellent physical and chemical properties. Test results are summarized in Table I below. The relatively high intrinsic viscosities of the products indicate a high degree of polymerization and high molecular weights and the Gardner Impact test results indicate a high practical impact strength.

TABLE I

| Example No. | Residual o-DCB Concentration | Intrinsic Viscosity (dl/g) | Gardner Impact (lb.) |
|---|---|---|---|
| I | 1122–2350 | — | — |
| II | <20–22 | .46–.49 | 150 |
| III | 19–38 | .48 | >320 |
| IV | .78 | .45 | >320 |
| V | 77 | .49 | >320 |
| VI | 267–276 | .48 | 298 |
| VII | <20–147 | .47–.48 | 311,>320 |
| VIII | 27–101 | .49 | >320 |
| IX | 120–129 | — | >320 |
| X | — | .44 | — |
| XI | 33–144 | .48–.49 | >320 |
| XII | 127–232 | .45–.49 | >320 |
| XIII | 65–198 | .45–.51 | >320 |
| XIV | 120 | .49 | >320 |
| XV | <20–25 | .47 | >320 |
| XVI | <20 | .46 | >320 |
| XVII | <20–65 | .47 | >320 |
| XVIII | 90–100 | .45 | 313 |

I claim:

1. A process for making polyetherimide, which comprises:

(a) reacting an aromatic bis(ether anhydride) of the formula

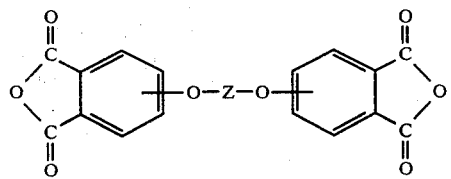

with an organic diamine of the formula

H₂N-R-NH₂ in an inert solvent under polyetherimide-forming conditions, which include a reaction temperature of from about 40° C. to about 200° C., to form a prepolymer-solvent mixture;

(b) forming a thin film of the prepolymer-solvent mixture under solvent-volatilizing conditions, which includes a temperature of from about 200° C. to about 450° C., to effect substantially complete removal of solvent and water of reaction from said mixture to form a prepolymer; and (c) heating the prepolymer to a temperature above the glass transition temperature of the final polyetherimide product and less than about 450° C. to form the polyetherimide; wherein, Z is a member selected from the class consisting of (A) divalent organic radicals having the following formulas

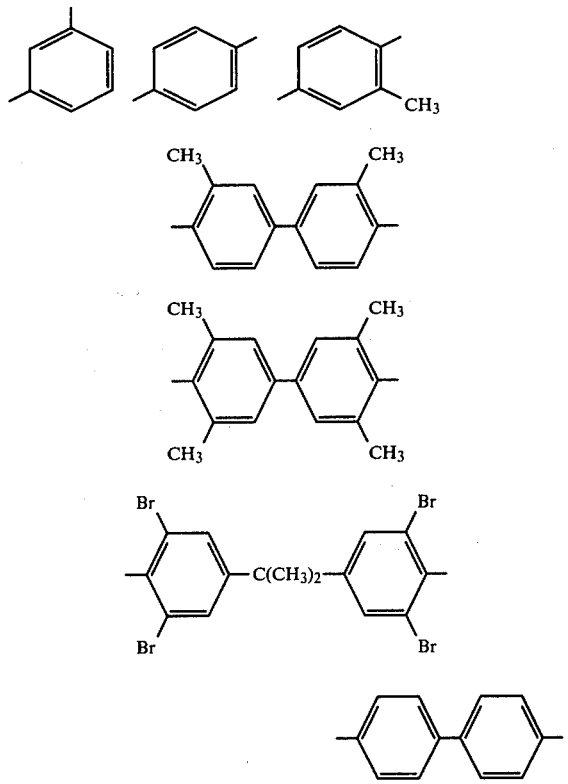

and (B) divalent organic radicals of the general formula

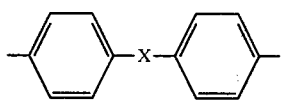

wherein X is a member selected from the group consisting of divalent radicals of the formulas

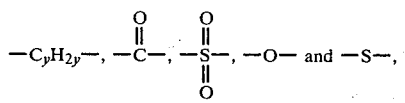

where y is an integer from 1 to about 5; and R is a divalent organic radical selected from the group consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane, and divalent radicals of the general formula

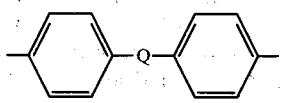

where Q is a member selected from the class consisting of

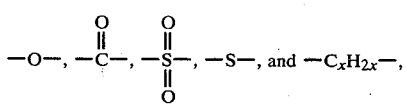

and x is an integer from 1 to about 5.

2. The process of claim 1, wherein the aromatic bis (ether anhydride) is of the formula

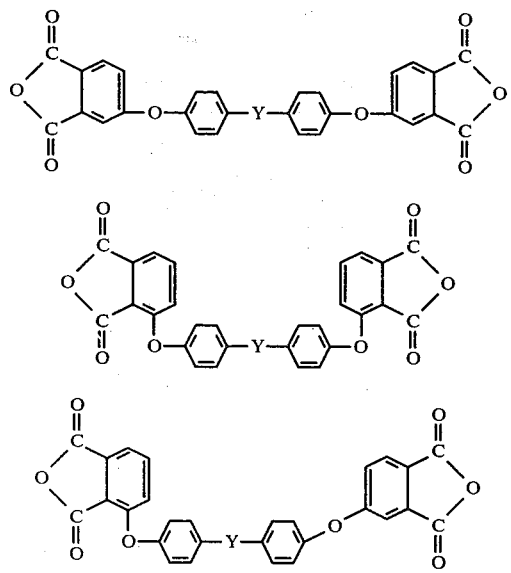

and mixtures thereof, where Y is selected from the group consisting of —O—, —S—,

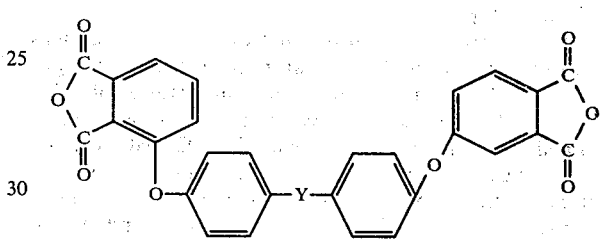

3. The process of claim 2, wherein the aromatic bis (ether anhydride) is of the formula

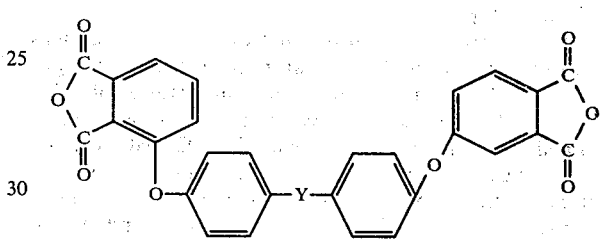

and Y is as defined above.

4. The process of claim 2, wherein the aromatic bis(ether anhydride) is of the formula and Y is as defined above.

5. The process of claim 1, wherein the aromatic bis (ether anhydride) is 2,2-bis[4-(3,4-dicarboxyphenoxy)-phenyl] propane dianhydride and the organic diamine is m-phenylenediamine.

6. The process of claim 1, wherein the polyetherimide-forming conditions of step (a) include a reaction solvent which is an inert nonpolar organic solvent or an inert polar solvent that does not deleteriously affect the reaction.

7. The process of claim 1, wherein the reaction temperature is from about 80° C. to about 180° C., the reaction solvent is selected from the group consisting of benzene, toluene, xylene, ethylbenzene, propylbenzene, chlorobenzene, dichlorobenzenes, trichlorobenzenes, biphenyl, terphenyl, diphenylether, diphenylsulfide, acetophenone, chlorinated biphenyls, chlorinated diphenylethers, dichlorethane, tetrachlorethane, trichloroethylene, tetrachloroethylene, methylcyclohexane, octane, isooctane and decane, and the polyetherimide-forming conditions further include conducting the reaction under an inert atmosphere.

8. The process of claim 7, wherein the molar ratio of organic diamine to aromatic bis (ether anhydride) is from about 0.5:1 to about 2:1.

9. The process of claim 7, wherein the molar ratio of organic diamine to aromatic bis(ether anhydride) is from about 0.9:1 to about 1.1:1.

10. The process of claim 9, wherein the reaction mixture of step (a) further includes monofunctional organic amine or an organic anhydride to provide molecular weight control and a catalytic amount of a catalyst selected from the group consisting of alkali metal carbonates, sodium chlorate, ferric sulfate and alkali metal salts of oxygenated phosphorous compounds.

11. The process of claim 10, wherein the catalyst is sodium phenyl phosphonate.

12. The process of claim 1 or 10, wherein the temperature is from about 250° C. to about 350° C., and the solvent-volatilizing conditions further include a reduced pressure.

13. The process of claim 12, wherein step (b) is conducted in a thin-film evaporator.

14. The process of claim 1 or 10, wherein the temperature employed in step (c) is from about 250° C. to about 350° C.

15. The process of claim 12, wherein the temperature employed in step (c) is from about 250° C. to about 350° C.

16. The process of claim 14, wherein step (c) is conducted in a second thin-film evaporator under reduced pressure.

17. The process of claim 15, wherein step (c) is conducted in a second thin-film evaporator under reduced pressure.

18. The process of claim 14, wherein step (c) is conducted in a screw extrusion apparatus under reduced pressure.

* * * * *